United States Patent
Pentland

[11] Patent Number: 6,082,956
[45] Date of Patent: Jul. 4, 2000

[54] PORTABLE STORAGE CABINET WITH INTEGRATED DETACHABLE DOLLY

[76] Inventor: Ian William Pentland, Steadwell House Church End, Leckhampstead, United Kingdom, MK18 5NN

[21] Appl. No.: 09/202,159
[22] PCT Filed: Jun. 17, 1997
[86] PCT No.: PCT/GB97/01626
§ 371 Date: Dec. 9, 1998
§ 102(e) Date: Dec. 9, 1998
[87] PCT Pub. No.: WO97/48310
PCT Pub. Date: Dec. 24, 1997

[30] Foreign Application Priority Data

Jun. 19, 1996 [GB] United Kingdom ............. 9612777

[51] Int. Cl.⁷ .................. A47B 53/00; B62B 3/06
[52] U.S. Cl. .................. 414/495; 414/498; 254/2 R
[58] Field of Search .................. 414/495, 498; 254/2 R, 2 B, 5 R, 5 B, 104

[56] References Cited

U.S. PATENT DOCUMENTS

| | | |
|---|---|---|
| 1,027,816 | 5/1912 | Cassity . |
| 1,348,073 | 7/1920 | Almy . |
| 2,959,311 | 11/1960 | Rosenow ............. 414/512 |
| 3,305,117 | 2/1967 | Ford ............. 414/515 |
| 3,535,009 | 10/1970 | Cain . |
| 3,647,014 | 3/1972 | Wilke et al. ............. 180/14 |
| 3,648,869 | 3/1972 | Christianson et al. ............. 414/515 |
| 3,785,675 | 1/1974 | Norris et al. ............. 280/150 R |
| 3,828,884 | 8/1974 | Burdick . |
| 4,106,634 | 8/1978 | Becker ............. 414/1 D |
| 4,714,026 | 12/1987 | Yamaguchi et al. . |
| 4,925,357 | 5/1990 | Cisternino et al. ............. 414/495 |
| 5,388,657 | 2/1995 | Shirashi . |
| 5,405,236 | 4/1995 | Sundstrom et al. ............. 414/495 |
| 5,448,945 | 9/1995 | Taylor et al. ............. 100/100 |

FOREIGN PATENT DOCUMENTS

| | | |
|---|---|---|
| 3147631 A1 | 6/1983 | Germany . |
| 3902340 A1 | 8/1990 | Germany . |
| 8-182543 | 7/1996 | Japan . |
| 651476 | 4/1951 | United Kingdom . |
| 1 244 573 | 9/1971 | United Kingdom . |
| 1 457 947 | 12/1976 | United Kingdom . |
| 1 495 441 | 12/1977 | United Kingdom . |
| 2 201 938 | 9/1988 | United Kingdom . |
| WO 90/05686 | 5/1990 | WIPO . |

*Primary Examiner*—Robert P. Olszewski
*Assistant Examiner*—Gerald J. O'Connor
*Attorney, Agent, or Firm*—Merchant & Gould P.C.

[57] ABSTRACT

A storage unit has a base structure and a detachable dolly for transporting the storage unit. The detachable dolly includes a lifting member engageable with the base structure, the arrangement being such that the lifting member may be brought into engagement with the base structure, e.g. by insertion through a forwardly facing opening in the base structure. The detachable dolly may include castors to enable movement of the dolly.

7 Claims, 6 Drawing Sheets

CENTERLINE OF CABINET
& DOLLY IN LOCKED POSITION

PORTABLE STORAGE CABINET WITH INTEGRATED DETACHABLE DOLLY

FIELD OF THE INVENTION

The present invention relates to a storage system and to a storage unit, for example a cabinet. The invention further relates to a system for, and a method of, transporting articles.

In particular, but not exclusively, the invention relates to a storage system suitable for use in an of ice. For example, the storage unit may be a storage cabinet, a cupboard, a bookcase, or a drawer unit.

BACKGROUND OF THE INVENTION

One disadvantage of most existing storage systems is that when the arrangement of the office furniture has to be changed, or a storage unit has to be moved from one place to another, it is usually necessary to empty any contents from the storage units before they can be moved. This involves considerable inconvenience and effort, as well as creating the risk of losing or mis-filing documents when they are returned to the storage units. It is, therefore, a great advantage if the storage units can be moved without being emptied, although this is not normally possible owing to the great weight of the contents.

A storage system is known that allows the storage units to be moved without first being emptied. In this system, each storage unit has engagement points on either side that can be engaged by a specialized dolly, allowing the unit to be lifted and moved to its new position.

The main disadvantage of this system is that in order to lift a storage unit, the dolly has to have access to both sides of the unit. In practice, this is often not possible either because the unit has been positioned in a corner with one of the engagement points flush against a wall, or because several units have been placed next to one another with no gaps in between. Although this problem could be avoided by leaving gaps on both sides of the units that is, of course, wasteful of space. Another disadvantage of the known system is that the engagement points are unsightly, which is a genuine consideration in a modern office environment.

SUMMARY OF THE INVENTION

It is an object of the present invention to provide a storage system that mitigates at least some of the aforementioned disadvantages.

According to the present invention there is provided a storage system including a storage unit having a base structure and a dolly for transporting the storage unit, said dolly including a lifting member engageable with the base structure, the arrangement being such that the lifting member may be brought into engagement with the base structure without requiring access to the sides of the storage unit.

Because the dolly does not require access to the sides of the storage unit, the units may be placed side-by-side with no wasted space, or flush against a dividing wall. When it becomes necessary to move a storage unit to a different position, this can be achieved easily without the need to empty the storage unit.

Advantageously, the base structure includes a forwardly-facing opening, the lifting member being brought into engagement with the base structure by insertion through said opening. Preferably, the opening is provided at ground level. This allows the dolly to be inserted underneath the storage unit so improving the stability of the unit when it is lifted and avoiding the need for a counterweight on the trolley device.

The lifting mechanism can also be relatively simple and uncomplicated.

The storage unit may include a removable or movable panel adapted to cover said opening. This hides the base structure and improves the aesthetic appearance of the storage unit.

Advantageously, the width of the lifting member is less than the width of the storage unit.

The lifting member may be arranged to provide for transverse movement of the storage unit relative to the trolley device, so allowing the storage unit to be moved to a position where its center of gravity is located centrally of the dolly.

The dolly device may include a lifting mechanism for raising the lifting member. The lifting mechanism may be arranged to cause simultaneous lifting and transverse movement of the lifting member. The lifting mechanism preferably includes an interlock to prevent the lifting member being raised when it is not properly engaged with the base structure.

The system may include means for clamping the storage unit to the dolly. The system may be arranged such that lifting of the storage unit causes the unit to be clamped to the dolly.

The present invention further provides a system for the transportation of storage units, the system including a base structure for attachment to a storage unit and a dolly for transporting the base structure and the storage unit attached thereto, said dolly including a lifting member engageable with the base structure, the arrangement being such that the lifting member may be brought into engagement with the base structure without requiring access to the sides of the storage unit.

According to another aspect of the present invention there is provided a storage system including a storage unit having a base structure and a dolly for transporting the storage unit, said base structure comprising first and second side members, a connecting member connecting said first and second side members and a bracket member extending inwards from each of said first and second side members, said base structure having a forwardly-facing opening, said dolly including a lifting structure that is engageable with the base structure, said lifting structure comprising a lower member having a plurality of castors or like means for enabling movement of the dolly; an upper member mounted on said lower member for vertical movement relative thereto and an actuator for generating vertical movement of said upper member between a lowered position and a raised position;

the arrangement being such that when the storage unit is standing on the floor, the height of the bracket members is less than the height of the lower member and the height of the connecting member is greater than the height of the upper member in the lowered position, whereby the lifting structure of the dolly may be inserted into the opening in the base structure between the connecting member and the bracket members and, when the upper member is lifted to the raised position, the upper member engages the connecting member, thereby lifting the storage unit and clamping the storage unit to the dolly by bringing the bracket members into engagement with the lower member.

Advantageously, said upper member is mounted on said lower member for vertical and transverse movement relative thereto and said actuator is adapted to generate both vertical and transverse movement of said upper member as said upper member is lifted from a lowered position to a raised position.

According to another aspect of the present invention there is provided a storage system including a storage unit having a base structure and a dolly for transporting the storage unit, said base structure comprising first and second side members and a connecting member connecting said first and second side members, said base structure having a forwardly-facing opening, said dolly including a lifting structure that is engageable with the base structure, said lifting structure comprising a lower member having a plurality of castors or like means for enabling movement of the dolly; an upper member mounted on said lower member for vertical and transverse movement relative thereto and an actuator for generating vertical and transverse movement of said upper member between a lowered position and a raised, transversely displaced position;

the arrangement being such that when the storage unit is standing on the floor, the height of the connecting member is greater than the height of the upper member in the lowered position, whereby the lifting structure of the dolly may be inserted into the opening in the base structure beneath said connecting member and, when the upper member is lifted to the raised position, the upper member engages the connecting member, thereby lifting the storage unit and transporting the storage unit transversely to a position of increased stability.

According to another aspect of the present invention there is provided a storage unit for use with a storage system as described herein.

According to another aspect of the present invention there is provided a storage cabinet for storing documents and the like, said cabinet including an upper, storage part and a base structure located underneath the storage part, said base structure comprising first and second side members and a connecting member connecting said first and second side members, said base structure having a forwardly-facing opening, said base structure being engageable with a dolly including a lifting structure that may be inserted into the opening in the base structure beneath said connecting member, whereby the cabinet may be lifted and transported to a new position without removing the contents therefrom.

According to a further aspect of the invention there is provided a system for the transportation of articles, the system comprising at least one article having a base structure, and a dolly for transporting the article, said dolly including a lifting member that may be brought into engagement with the base structure to lift the article.

According to a further aspect of the invention there is provided a method of transporting articles, wherein each said article has a base structure, the method comprising arranging a dolly having a lifting member underneath said base structure, raising the lifting member to engage the base structure and thereby lift the article, and transporting the lifted article on the dolly.

Embodiments of the invention will now be described, by way of example, and with reference to the accompanying drawings, of which:

DETAILED DESCRIPTION OF THE INVENTION

Figure 1:
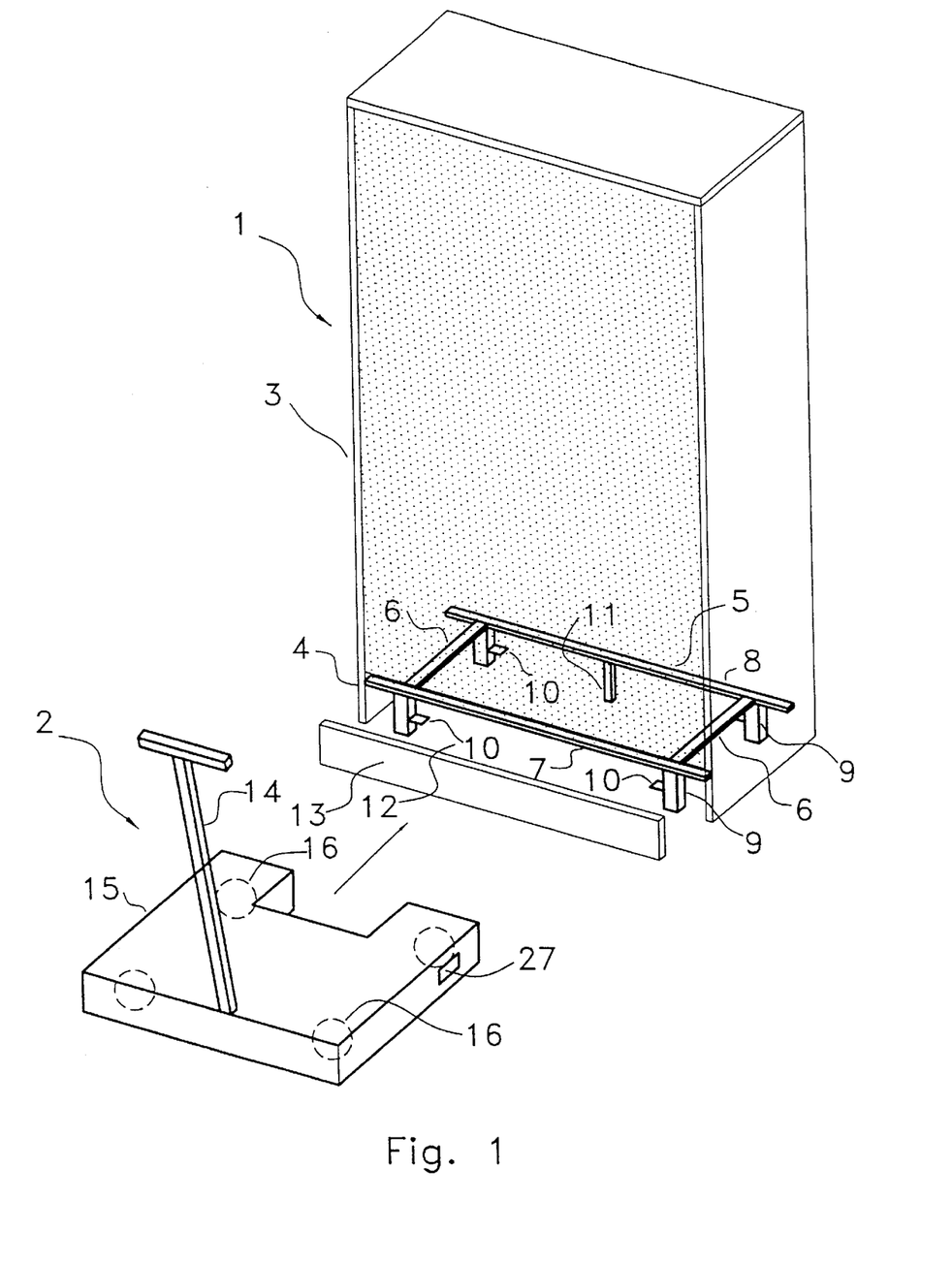
FIG. 1 is a perspective view of the storage system, including a storage unit and a dolly.

As shown in FIG. 1, the storage system consists of a storage unit indicated generally by the reference number 1 and a dolly indicated generally by the reference number 2.

The storage unit 1, which may be a cupboard, cabinet, bookcase, shelving unit or other type of office furniture, consists of an upper storage part 3 of conventional design and a base structure 4 that includes a support frame 5. The support frame 5 may, for example, be a welded steel structure, that supports the weight of the storage unit 1. The support frame 5 consists of a framework of two side bars 6 and front and rear connecting bars 7, 8, to which there are attached four legs 9. Each leg 9 includes an inwardly-facing bracket 10 at about half the height of the leg. A further leg 11 extends downwards from the center of the rear connecting bar 8. The support frame 5 is enclosed substantially within the storage unit 1, so as not to detract from the appearance of the unit.

The base structure 4 has a forwardly-facing opening 12 at ground level between the two front legs 9 and below the front bar 7. A removable panel (or skirt) 13 may be attached to the two front legs 9 to hide the opening 12. When the panel 13 is attached, the storage unit 1 is entirely conventional in appearance. Alternatively, the panel 13 may be attached to the storage unit 1 by means of a hinge, so that it can be moved to an open position to provide access to the opening 12.

Figure 2:
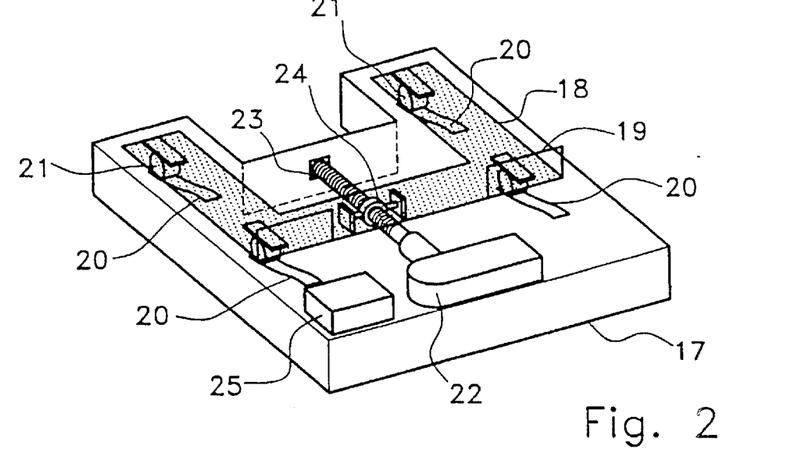
FIG. 2 is a perspective view of the base part of the trolley device, showing the main internal components of the lifting mechanism.
Figure 3:
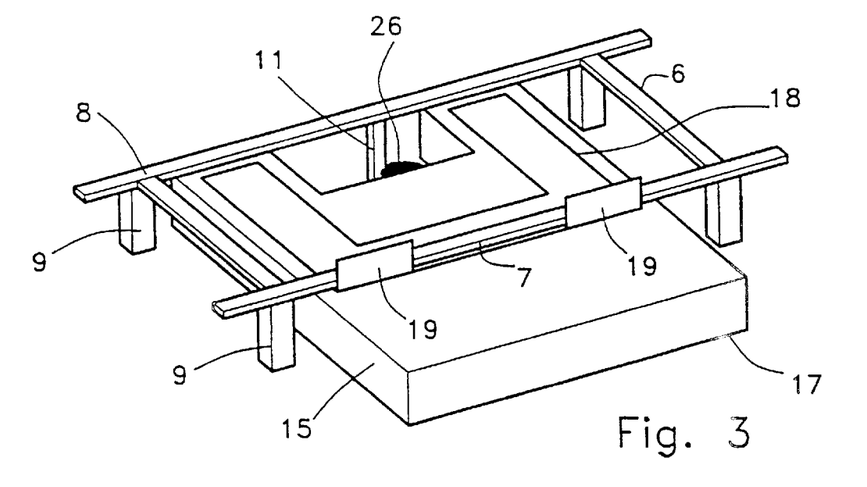
FIG. 3 is a perspective view showing the base part of the dolly located underneath the support frame of the storage unit.
Figure 4:
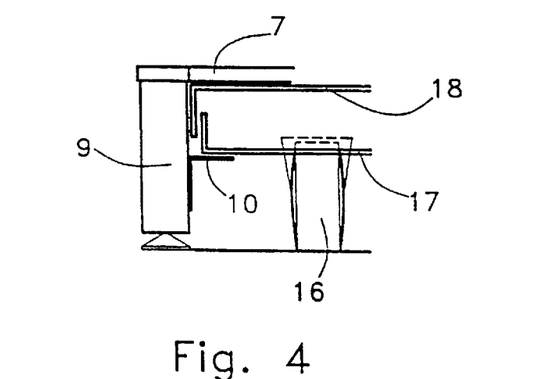
FIG. 4 is an end view showing the base part of the dolly located underneath the support frame of the storage unit.

The dolly 2 includes a handle 14 and a base part 15 having four castors or wheels 16 arranged one at each of its four corners. As shown in FIGS. 2, 3 and 4 and in more detail in FIGS. 11 to 14, the base part 15 includes a bottom plate 17 to which the castors 16 are attached, and a top plate 18 that is adapted for upwards and rearwards movement relative to the bottom plate 17. A pair of stop plates 19 extend upwards from the upper surface of the top plate 18 (as shown in FIG. 3).

Located between the bottom plate 17 and the top plate 18 there is provided a lifting mechanism, which is shown most clearly in FIG. 2. The lifting mechanism comprises a set of four sloped ramps 20 provided on the bottom plate 17 and four rollers 21 that are mounted on the underside of the top plate 18 and arranged to run on the ramps 20. A pin 21a (see FIGS. 12 to 14) is associated with each of the rollers 21 and extends horizontally underneath the ramp 20 to prevent the top plate 18 being detached from the bottom plate 17.

Figure 11:
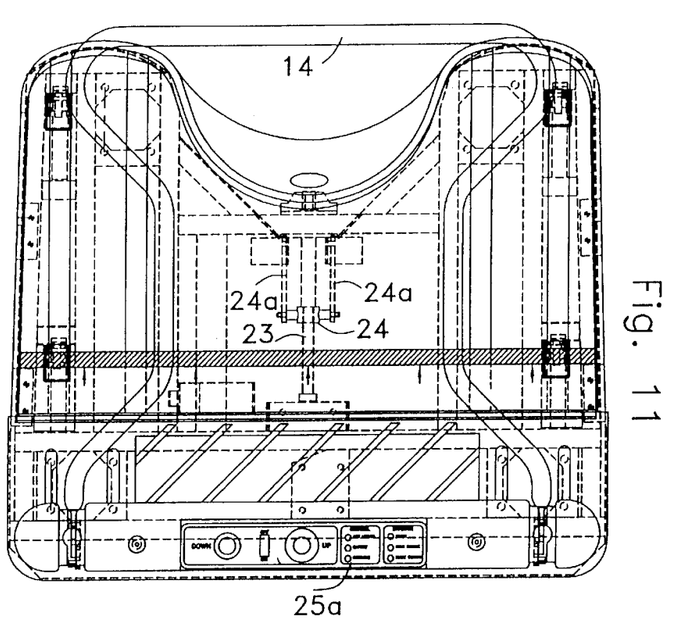
FIG. 11 is a plan view of an electrical dolly.
Figure 12:
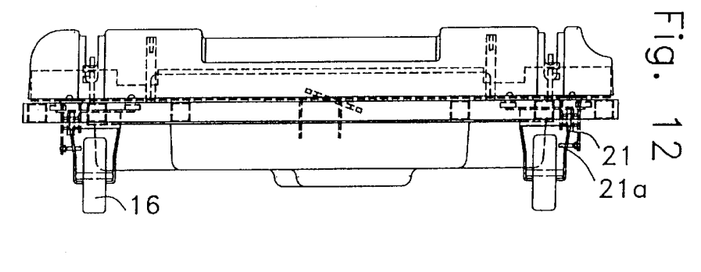
FIG. 12 is a front elevation of the dolly shown in FIG. 11.
Figure 13:
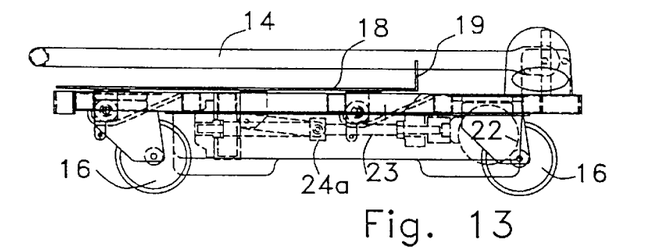
FIG. 13 is a side elevation of the dolly device shown in FIG. 11.
Figure 14:
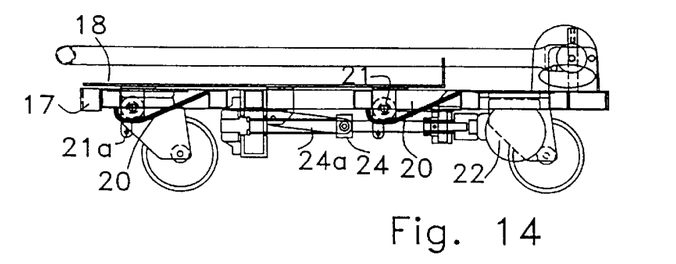
FIG. 14 is a cross-section of the dolly shown in FIG. 11 on line XIV—XIV.

An electric motor 22 is attached to the bottom plate 17 and is arranged to drive a worm 23 that engages a threaded drive member 24, which is connected to the underside of the top plate 18 by two pivot links 24a (shown in FIGS. 11, 13 and 14). The motor 22 may be powered by a rechargeable battery 25 or from the mains electricity supply. Alternatively, the motor 22 may be replaced by a simple crank handle (not shown).

When the motor 22 is activated, the top plate 18 is drawn rearwards towards the motor, so causing the rollers 21 to rise up the ramps 20. The top plate 18 is thus raised relative to the floor and the bottom plate 17 and is simultaneously drawn rearwards, towards the handle 14. Reversing the motor obviously causes the top plate 18 to move downwards and forwards away from the handle 14.

The current consumption of the motor is monitored by an electronic mapping device (not shown) that senses when the cabinet is in a fully lifted and locked position. The device also provides status indications to the user, by means of a display panel 25a.

Figure 5:
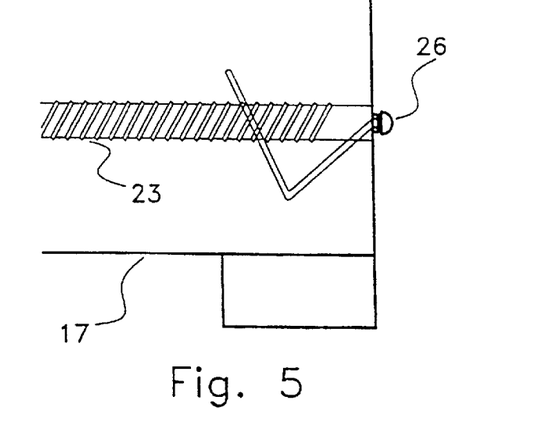
FIG. 5 is a side view of a part of the lifting mechanism of the dolly.

The lifting mechanism includes a mechanical safety interlock, which is shown in FIG. 5. The interlock consists of a mechanical push latch 26 with a spring return that interlocks with the worm 23 to engage the drive mechanism when the latch is fully depressed. The push latch 26 engages the central leg 11 of the support frame 5 when the dolly 2 is correctly located under the storage unit 1 and, if the dolly is not correctly located, so that the push latch 26 is not depressed, the drive mechanism will remain disengaged so preventing the top plate 18 from being raised.

The dolly may include an additional latch mechanism 27 on either side of the base portion 15, to ensure that the dolly is correctly located under the storage unit 1. Microswitches (not shown) may also be provided to switch off the electric motor 22 when the top plate 18 reaches a fully raised or fully lowered position.

Figure 6:
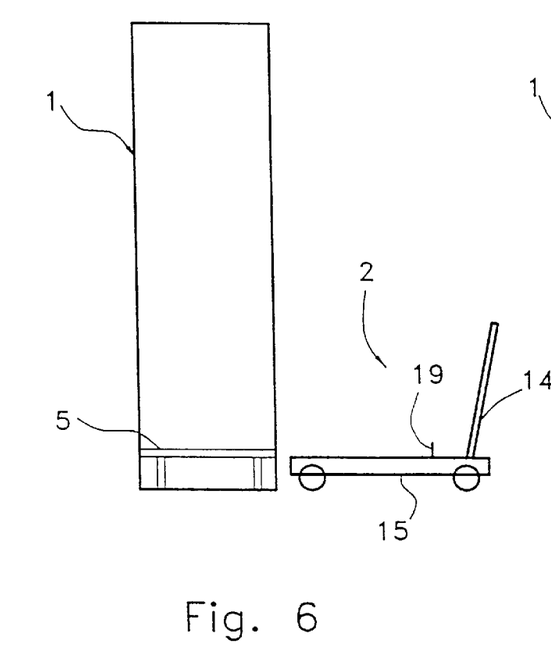
FIGS. 6, 7 and 8 are side views showing the process of lifting a storage unit using the dolly.
Figure 7:
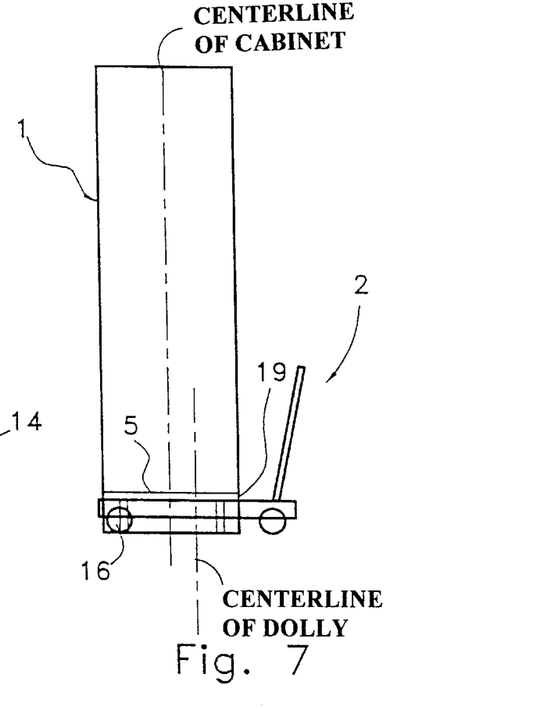

When it is necessary to move the storage unit 1, the removable panel 13 is first removed to reveal the opening 12, and the base part 15 of the dolly 2 is then aligned with the opening as shown in FIG. 6 and pushed underneath the storage unit 1 to the position shown in FIG. 7, where the stop plates 19 engage the front of the supporting frame 5. It should be noted that in this position, prior to lifting, the front castors 16 are located underneath the storage unit 1 and the base part 15 of the dolly 2 does not extend far beyond the rear of the storage unit 1. The dolly 2 may thus be used to lift a storage unit 1 that is placed almost flush against a wall or partition.

The top plate 18 of the dolly 2 will then lie just below the connecting bars 7, 8 and the bottom plate 17 will be just above the four inwardly-facing brackets 10 on the legs 9 of the storage unit 1, as is shown in FIG. 4.

When the lifting mechanism is activated, the top plate 18 rises up on the ramps 20 so that it first engages the connecting bars 7, 8 and then lifts the storage unit 1. As the unit 1 is lifted, the base part 15 of the dolly 2, comprising top plate 18 and bottom plate 17, increases in thickness, thereby bringing the brackets 10 on the legs 9 of the unit 1 firmly into engagement with the underside of the bottom plate 17. This clamps the storage unit securely to the dolly 2. The dolly 2 and the lifted unit 1 thus form a stable assembly that cannot easily be tipped over.

Figure 8:
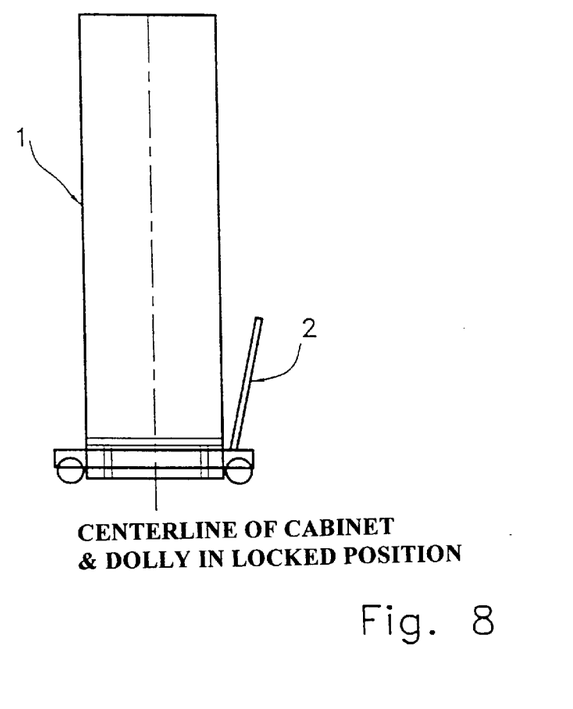

Before the unit is lifted, the centerline of the storage unit 1 is some distance in front of the centerline of the dolly 2 as shown in FIG. 7. This would affect the stability of the unit if it were to be lifted straight upwards in that position. This problem is however avoided because as the unit 1 is lifted, the top plate 18 is simultaneously drawn rearwards towards the handle 14 so that, in the fully raised position, the center lines of the unit 1 and the dolly 2 coincide substantially with one another, as is shown in FIG. 8. The storage unit 1 is then located centrally between the front and rear castors 16, which ensures the stability of the unit.

The stability of the lifted unit 1 is enhanced further by making the width of the base part 2 such that it is a close fit between the legs 9, which ensures that the dolly 2 is centrally located between the sides of the storage unit 1 and that the castors are as far apart widthwise as possible.

Figure 9:
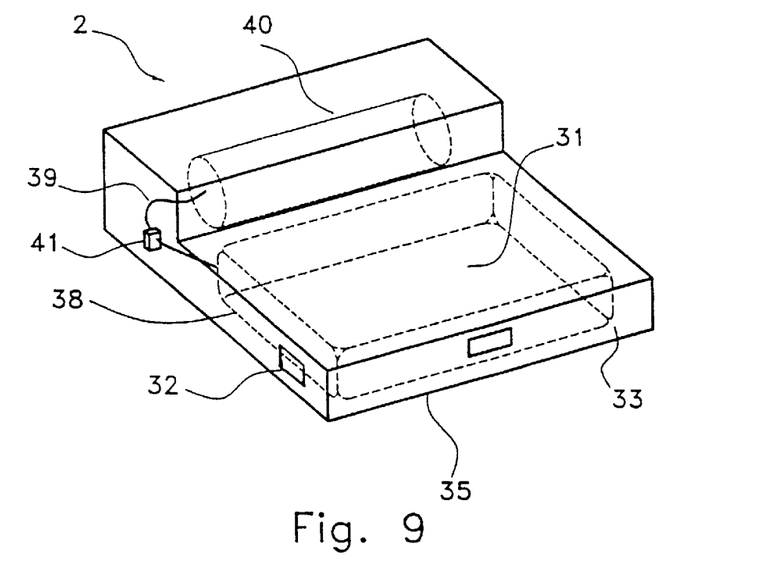
FIG. 9 is a perspective view of the base part of the dolly according to a second embodiment of the invention, in which the lifting mechanism is pneumatically operated.
Figure 10:
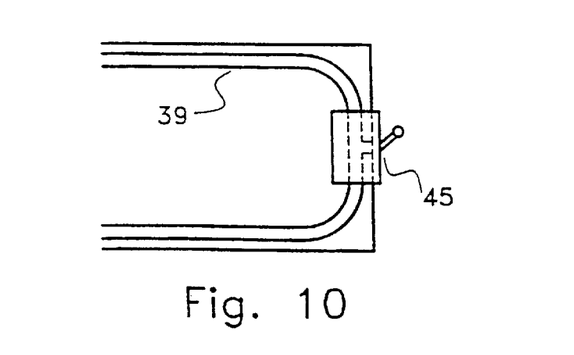
FIG. 10 is a side view of a part of the pneumatic circuit of the trolley shown in FIG. 9.

An alternative pneumatic version of the lifting mechanism 18 is shown in FIGS. 9 and 10. In this version, the base part 2 is in the form of a rigid box having a top plate 31, two side walls 32 and a front wall 33. A base plate 35 that carries the castors is located underneath the box. The lower edges of the side walls 32 and the front wall 33 are turned inwards so as to engage the lower surface of the rigid plate 35, thus limiting the upwards movement of the top plate 31.

Located between top plate 31 and the base plate 35 there is provided an inflatable bag 38, which is connected via a connecting line 39 to a cylinder 40 of compressed gas. A three-way valve 41 is provided in the connecting line 39 and is controlled by a switch (not shown) on the trolley handle. Moving the switch to a first position allows gas to flow from the cylinder 40 into the bag 38, thereby raising the top plate 31. Moving the switch to a second position allows air to escape from the bag, so allowing the top plate 31 to fall.

As shown in FIG. 10, the pneumatic circuit also includes an interlock switch 45 in the connecting line 39, which is operated by engagement with the central leg 11 on the support frame 5 when the trolley device 2 is correctly located under the storage unit 1. When the dolly 2 is correctly located, the interlock switch 35 is activated, allowing gas to flow into the bag and so lift the storage unit. However, if the dolly is not correctly located, so that the interlock switch 45 is not activated, this prevents gas entering the bag and so prevents the storage unit being lifted.

A hydraulic version of the dolly 2 is shown in FIGS. 15 to 18. The base part 15 is divided into three sections, comprising two side units 50a,b and a central plate 52 that connects the two side units 50a,b rigidly together. Each side unit 50a,b includes a bottom plate 17 having two castors 16 and a movable top plate 18, which is attached to the bottom plate 17 by means of two pairs of pivot links 54. A hydraulic cylinder 56a,b is arranged to drive the top plate 18 upwards and rearwards, as guided by rotation or the pivot links 54. A handle 14 for maneuvering the dolly is connected to the central connecting plate 52 by means of a pivot pin 55.

Figure 15:
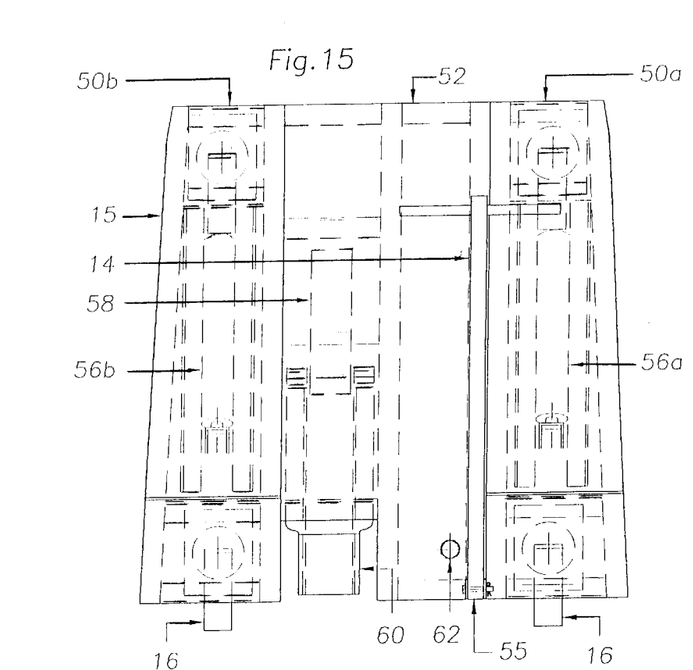
FIG. 15 is a plan view of a hydraulic dolly.
Figure 16:
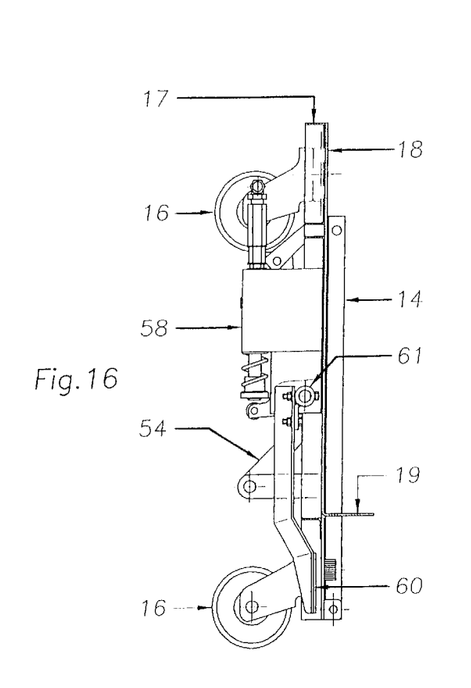
FIG. 16 is a cross-section of the dolly shown in FIG. 15 on line XVI—XVI.
Figure 17:
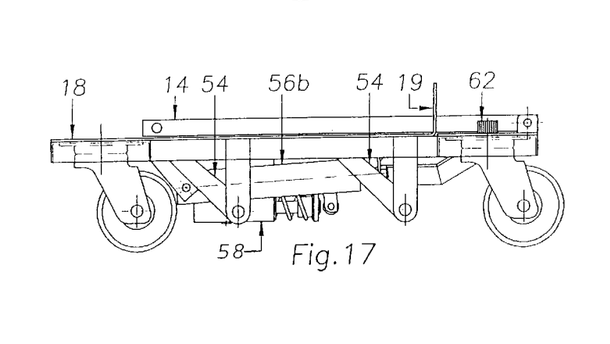
FIG. 17 is a side elevation of the dolly shown in FIG. 15.
Figure 18:
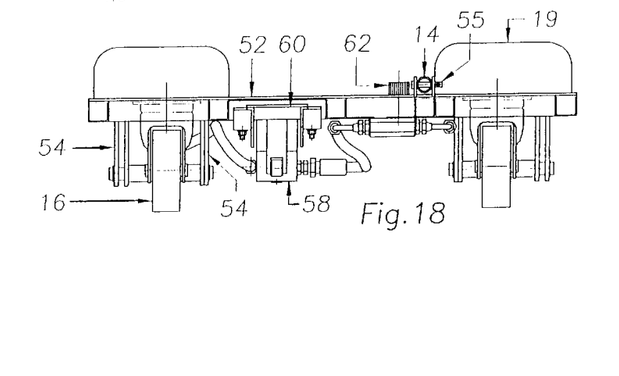
FIG. 18 is a front elevation of the dolly shown in FIG. 15.

The central plate 52, which connects the two side units 50a,b rigidly together, may have a variety or widths and the dolly 2 can thus be adapted to fit storage units 1 of different widths by exchanging the central plate 52 for another of a different width.

The central plate 52 includes a hydraulic pump 58 that may be actuated by means of a foot pedal 60 mounted on a pivot pin 61. The pump 58 is connected in series via the first hydraulic cylinder 56a, which is double-acting cylinder, to the second hydraulic cylinder 56b, which is a single-acting cylinder. This hydraulic arrangement ensures that the first and second hydraulic cylinders 56a,b operate synchronously with each other, so that the storage unit is lifted evenly. Hydraulic pressure may be released by operating a hydraulic release valve 62 that is mounted on the central plate 52 and connected in series between the pump 58 and the first cylinder 56a.

Various modifications of the storage system are, of course, possible and the embodiments described herein are intended to illustrate only examples of a storage system according to the invention. For example, the lifting mechanism may take various other forms and different methods of securing the storage unit to the dolly are also envisaged.

It is further envisaged that the base structure 4 of the storage unit 1, comprising the support frame 5 and a surrounding plinth including the removable panel 13, may be sold separately for retro-fitting to existing storage furniture, for example by bolting the support frame 5 to the bottom of the furniture. It is intended that a base structure 4 in combination with a dolly 2 should be within the scope of the present invention.

It is yet further envisaged that the system described herein may, with certain obvious modifications, be applied to other heavy articles, such as vending machines or washing machines, making them easier to move and reducing the risk of injury or of damage to furniture or decor. Such an application of the system is intended to be within the scope of the present invention.

I claim:

1. A storage system including a storage unit having a base structure and a dolly for transporting the storage unit, said base structure comprising first and second side members, a connecting member connecting said first and second side members and a bracket member extending inwards from each of said first and second side members, said base structure having a forwardly-facing opening, said dolly including a lifting structure that is engageable with the base structure, said lifting structure comprising a lower member having a plurality of castors for enabling movement of the dolly; an upper member mounted on said lower member for vertical movement relative thereto and an actuator for generating vertical movement of said upper member between a lowered position and a raised position;

the arrangement being such that when the storage unit is standing on the floor, the height of the bracket members is less than the height of the lower member and the height of the connecting member is greater than the height of the upper member in the lowered position, whereby the lifting structure of the dolly may be inserted into the opening in the base structure between the connecting member and the bracket members and, when the upper member is lifted to the raised position, the upper member engages the connecting member, thereby lifting the storage unit and clamping the storage unit to the dolly by bringing the bracket members into engagement with the lower member.

2. A storage system according to claim 1, in which the base structure includes a panel adapted to cover said opening.

3. A storage system according to claim 1, wherein said upper member is mounted on said lower member for vertical and transverse movement relative thereto and said actuator is adapted to generate both vertical and transverse movement of said upper member as said upper member is lifted from a lowered position to a raised position.

4. A storage system according to claim 1, in which the lifting structure includes an interlock to prevent the upper member being raised when the lifting structure is not properly engaged with the base structure.

5. A storage cabinet for storing documents, and a dolly for moving the cabinet, wherein the cabinet includes an upper, storage part and a base structure located underneath the storage part, said base structure comprising first and second side members and a connecting member connecting said first and second side members, and a bracket member extending inwards from each of said first and second side members, said base structure having a forwardly-facing opening, said dolly including a lifting structure that is engageable with the base structure, said lifting structure comprising a lower member having a plurality of castors for enabling movement of the dolly; an upper member mounted on said lower member for vertical movement relative thereto and an actuator for generating vertical movement of said upper member between a lowered position and a raised position;

the arrangement being such that when the storage cabinet is standing on the floor, the height of the bracket members is less than the height of the lower member and the height of the connecting member is greater than the height of the upper member in the lowered position, whereby the lifting structure of the dolly may be inserted into the opening in the base structure between the connecting member and the bracket members and, when the upper member is lifted to the raised position, the upper member engages the connecting member, thereby lifting the storage unit and clamping the storage unit to the dolly by bringing the bracket members into engagement with the lower member.

6. A system for the transportation of articles, the system including a base structure for attachment to an article and a dolly for transporting the article together with the attached base structure, on the dolly, said base structure comprising first and second side members, a connecting member connecting said first and second side members and a bracket member extending inwards from each of said first and second side members, said base structure having a forwardly-facing opening, said dolly including a lifting structure that is engageable with the base structure, said lifting structure comprising a lower member having a plurality of castors for enabling movement of the dolly; an upper member mounted on said lower member for vertical movement relative thereto and an actuator for generating vertical movement of said upper member between a lowered position and a raised position;

the arrangement being such that when the base structure is standing on the floor, the height of the bracket members is less than the height of the lower member and the height of the connecting member is greater than the height of the upper member in the lowered position, whereby the lifting structure of the dolly may be inserted into the opening in the base structure between the connecting member and the bracket members and, when the upper member is lifted to the raised position, the upper member engages the connecting member, thereby lifting the base structure and clamping the base structure to the dolly by bringing the bracket members into engagement with the lower member.

7. A method of transporting articles using a dolly, wherein each article has a base structure, said base structure comprising first and second side members, a connecting member connecting said first and second side members and a bracket member extending inwards from each of said first and second side members, said base structure having a forwardly-facing opening,     said dolly including a lifting structure that is engageable with the base structure, said lifting structure comprising a lower member having a plurality of castors for enabling movement of the dolly; an upper member mounted on said lower member for vertical movement relative thereto and an actuator for raising and lowering said upper member;

the method comprising inserting the lifting structure of the dolly into the opening in the base structure between the connecting member and the bracket members, raising the upper member such that it engages the connecting member and lifts the article, thereby bringing the bracket members into engagement with the lower member and clamping the article to the dolly, and transporting the lifted article on the trolley device.

* * * * *